United States Patent [19]
Zalenski

[11] Patent Number: 5,066,833
[45] Date of Patent: Nov. 19, 1991

[54] LOW POWER SENSING APPARATUS FOR DIGITIZER TABLETS

[75] Inventor: Thomas C. Zalenski, Killingworth, Conn.

[73] Assignee: Summagraphics Corporation, Seymour, Conn.

[21] Appl. No.: 612,530

[22] Filed: Nov. 13, 1990

[51] Int. Cl.$^5$ .............................................. G08C 21/00
[52] U.S. Cl. ...................................................... 178/19
[58] Field of Search ...................................... 178/18, 19

[56] References Cited

U.S. PATENT DOCUMENTS

| | | | |
|---|---|---|---|
| 3,732,369 | 5/1973 | Cotter | 178/18 |
| 4,012,588 | 3/1977 | Davis et al. | 178/18 |
| 4,054,746 | 10/1977 | Kamm | 178/19 |
| 4,455,451 | 6/1984 | Kriz | 178/18 |
| 4,713,496 | 12/1987 | Kimura et al. | 178/18 |
| 4,723,056 | 2/1988 | Tamaru et al. | 178/19 |
| 4,786,765 | 11/1988 | Yamanami et al. | 178/19 |
| 4,806,918 | 2/1989 | Berke et al. | 340/712 |

Primary Examiner—Stafford D. Schreyer
Attorney, Agent, or Firm—Rosen, Dainow & Jacobs

[57] ABSTRACT

A digitizer tablet consuming less power than is required of current tablets comprises short duration fast rise time energizing pulses, and a resonant circuit in the induced signal detector tuned to the frequency of the pulse repetition rate or preferably a higher frequency. Peak detector or timed sample and hold circuits are connected to the resonant circuit to improve resolution and reduce noise.

19 Claims, 4 Drawing Sheets

F.3.1

LOW POWER SENSING APPARATUS FOR DIGITIZER TABLETS

RELATED APPLICATION

U.S. application, Ser. No. 07/503,537, filed Apr. 3, 1990, entitled "DIGITIZER TABLET WITH SPLIT-CURRENT CONDUCTOR ARRAY" (SCG-383), and commonly assigned.

BACKGROUND OF INVENTION

This invention relates to digitizer tablets, and in general to position determination using electromagnetic interactions.

Commonly assigned U.S. Pat. No. 4,368,352, whose contents are herein incorporated by reference, describes a conventional digitizer tablet of the travelling-wave type. In this technique, the parallel spaced conductors of a grid extending along one coordinate axis are sequentially pulsed while a coil in a pointing device—cursor or stylus—is positioned over the grid. The fields generated by the pulsed conductors induce signals in the coil, which signals are typically processed by synchronous rectification and low-pass filtering to provide a characteristic composite waveform whose amplitude increases to a maximum, reverses phase and then falls off. Coarse and fine positions of the coil center are determined by the time-dependent zero crossing of the composite waveform. The pulsing circuit typically employs a 50 percent duty cycle. That is, current is flowing to the grid conductors about one-half the time during each scanning cycle. The result is a tablet that has proven very satisfactory in terms of performance and cost but consumes a relatively large amount of power.

U.S. Pat. Nos. 3,732,369 and 4,713,496 describe digitizer tablets employing a different technology in which time-dependent signals are not used. In this technology, coarse location of a pointing device is determined based on the amplitude and phase of voltages induced in neighboring wires. Fine position is established by interpolation between the voltages associated with each of the spaced wires. There are some indications of a reduced duty cycle, but the amount of power consumed is still substantial.

SUMMARY OF THE INVENTION

A principal object of the invention is a digitizer tablet using a position sensing technique requiring less operating power than is currently required of the commercial tablets.

Another object of the invention is a digitizer tablet using a low power sensing technique without paying a significant penalty in accuracy or resolution.

In accordance with one aspect of the present invention, a series of short duration, fast rise time pulses are applied to conductors of a digitizer tablet grid. The coil in the pointing device is connected in a resonant circuit tuned to a frequency equal to or preferably much higher than the pulse repetition frequency of the pulses. The result is to generate in the coil a damped alternating current (AC) ringing signal whose phase depends on which side of a pulsed conductor the coil is then positioned. The induced energy from the resonant circuit is measured and processed to obtain the pointing device position.

The invention contemplates operation in the reverse mode also, wherein the fast rise time pulses are applied to the coil in the pointing device, and the signals induced in the grid conductors sequentially derived by a scanner and successively processed. Whereas in the former case, the coil inductance could constitute part or all of the inductive component of the resonant circuit, in this latter case, if the conductor self-inductance is insufficient, it may be necessary to add a discrete inductor in series to enhance the overall inductance of the resonant circuit. Otherwise, both modes operate similarly.

In accordance with another aspect of the invention, the signal voltage developed in the resonant circuit is discretely sampled at a known point in its cycle. This greatly assists in developing the necessary position information even from low energy signals. Preferably, the sampling point is chosen at the peak of the resonant voltage, which in addition provides maximum noise immunity. Digitally processing the resultant measurements will also improve noise rejection. Multiple sampling of the damped AC signal waveform, preferably at its positive and negative peaks, will also improve resolution of the measurement.

In a typical measurement cycle in accordance with still a further aspect of the invention, the voltage peaks obtained as described above are stored, and then compared to determine a maximum (MAX) value. The conductor energized which corresponds to the stored MAX value obtained determines one of two possible coarse locations for the pointing device. The ambiguity can be resolved by determining the phase of the MAX peaks. Fine position is determined by interpolation.

The measurement technique of the invention allows use of a surprisingly low duty cycle of 10 percent or less. Satisfactory results have even been obtained with as low as a 2 percent duty cycle. The resultant savings in power will be evident to those skilled in this art.

The invention will now be described in greater detail in conjunction with the accompanying drawings in connection with several exemplary embodiments, from which further advantages and benefits associated with the invention will become apparent.

DETAILED DESCRIPTION OF PREFERRED EMBODIMENTS

Reference is made to the above-referenced patents for a more detailed description of known tablet constructions and their operation. Most of the details are unnecessary for a understanding of the present invention. Thus, it is not important to the present invention how the grid wires are laid out or scanned, whether individually or in group (examples will be given later), nor is it important how the analog voltages are amplified or associated with a particular grid wire as this is all well-known in the art. Moreover, as explained above, it doesn't matter whether the grid is energized and the output taken from the pointing device coil, or vice-versa. The present description will thus generally describe how the analog output voltages are converted into digital count values which ca then be processed to determine pointing device location. For this purpose, a particular tablet construction, typical of commercial units, will be assumed and the invention explained in the context of that assumed tablet, but it will be understood that the invention is not limited in its application to that assumed construction but is generally applicable to any digitizer tablet wherein analog signals are correlated to grid wire locations in the process of locating a pointing device with respect to those grid wires. Moreover, the assumed embodiment will illustrate the invention applied to determining pointing device position with respect to one coordinate of a typical X-Y coordinate system, but it will be understood that a similar grid array will exist for the other of the two coordinate axis system and the successive scanning of the second grid will generate the coordinate position for that second coordinate axis, which again is typical of known digitizer tablets. It will further be understood that, while a tablet is described that operates electromagnetically with an electrode array in the form of conductive deposits, the invention is also applicable to tablets that operate electrostatically with an electrode array. All of these tablets can employ a pointing device usually in stylus or cursor form and sometimes containing a linear transducer to output signals related to the applied stylus pressure.

Figure 1:
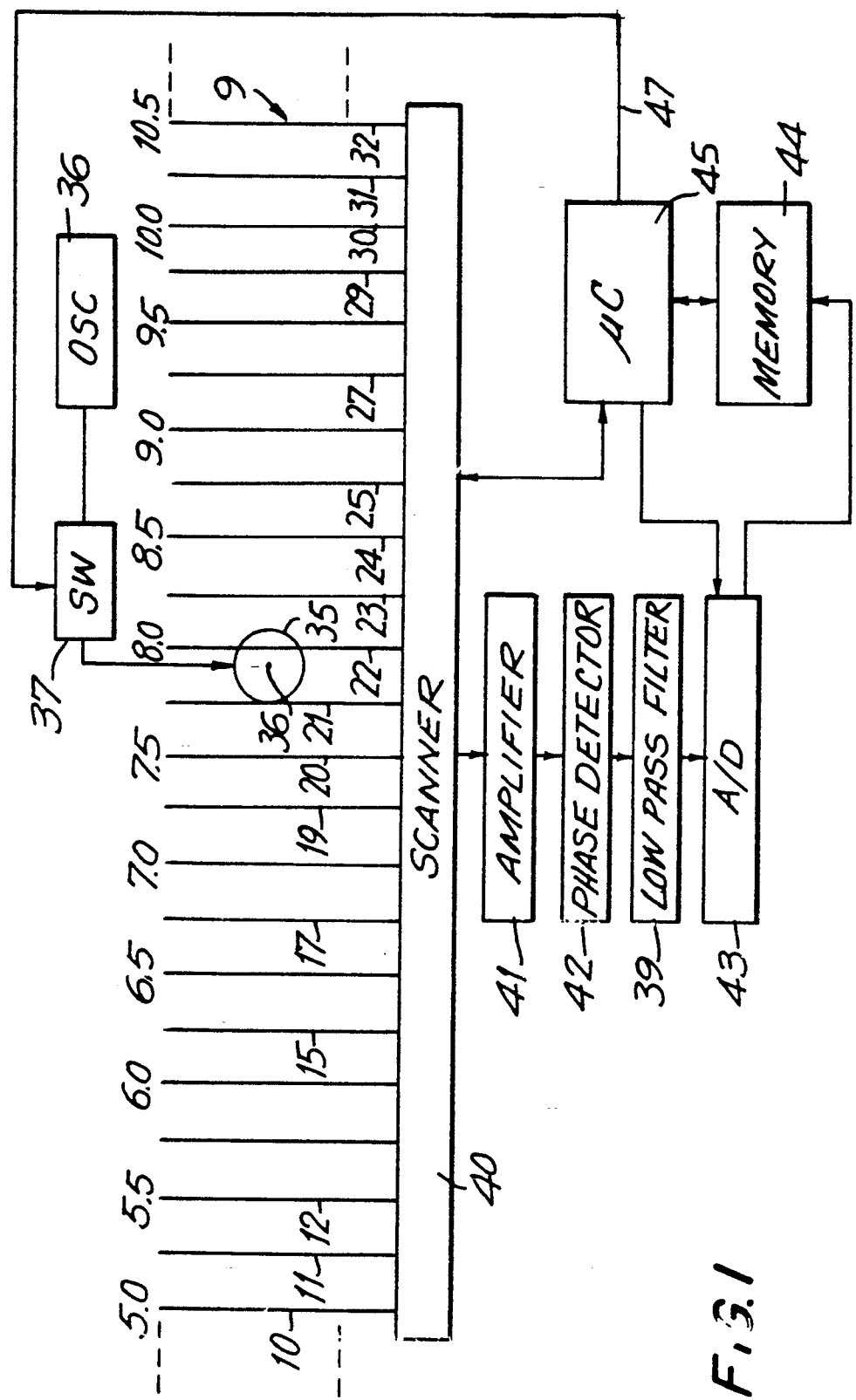
FIG. 1 is a schematic layout of the grid array for one coordinate axis of a known digitizer tablet, also showing a block diagram of the conventional signal processing circuitry.

FIG. 1 illustrates, schematically, the grid layout 9 of a portion of a typical known tablet. The grid wires 10-32 extend in, say, the Y direction and are used to determine X-coordinate positions. The grid wire locations with respect to the origin is indicated by the series of numbers at the top of the FIG. Thus, wire 10 is located 5.0 inches from the origin, wire 11 at 5.25 inches, wire 12 at 5.5 inches, and so on. A pointing device coil 35 is indicated by the circle, with its electrical center by numeral 36. The object is to locate the center 36 with respect to the grid array 9. In this exemplary embodiment, the tablet pointing device is driven by connecting the coil 35 to an oscillator 36 via a switch 37. Sequential scanning of the grid wires is carried out by a conventional scanner 40, and any voltages induced in a grid wire are amplified in a conventional amplifier 41, synchronous phase detector 42, low-pass filter 39, and then processed through a conventional A/D converter 43. The digital outputs are then stored in memory 44. All this is done under the control of a microcontroller ($\mu$C) 45.

In a typical operation, the scanner 40 connects each grid wire in turn to the amplifier 41 every, say, 100 $\mu$s. The induced voltage in that grid wire is derived, amplified, filtered, converted into a digital count and stored in successive memory locations in memory 44. The $\mu$C 45 is connected via line 47 to the switch 37 to turn the latter off during an initialization phase, so that a reference digital count can be determined without the coil 35 being energized and thus without a signal being induced in the wires. Later on during the processing, the switch 37 is turned back on.

While the illustrated embodiment shows the pointing device driven, and the signals induced in the electrode array conductors during scanning processed to determine the X-Y coordinates of the pointing device location, it is generally recognized that the operation can be reversed. In particular, the drive circuit or oscillator 36 can be connected by a multiplexer in turn to each conductor of the tablet electrode array, which will generate an electromagnetic field which induces in the pointing device coil a signal which can be correlated to the actual conductor currently pulsed. The latter is the preferred way to operate the system of the invention.

The present invention differs from the known digitizer tablet described above in the following ways. The pulses applied, for example, to each conductor have a very low duty cycle, preferably 10 percent or less, with a fast rise time. That means that current is flowing in any conductor of the tablet only 10 percent or less of real time. Since the induced signal is a function of the rise and fall time of current flowing in any conductor of the array, the result is that a relatively strong signal is induced in the pointing device. The present invention provides a number of techniques for sensing that signal so that reliable, accurate, and reproducible X-Y coordinate pairs are obtained.

Figure 2:
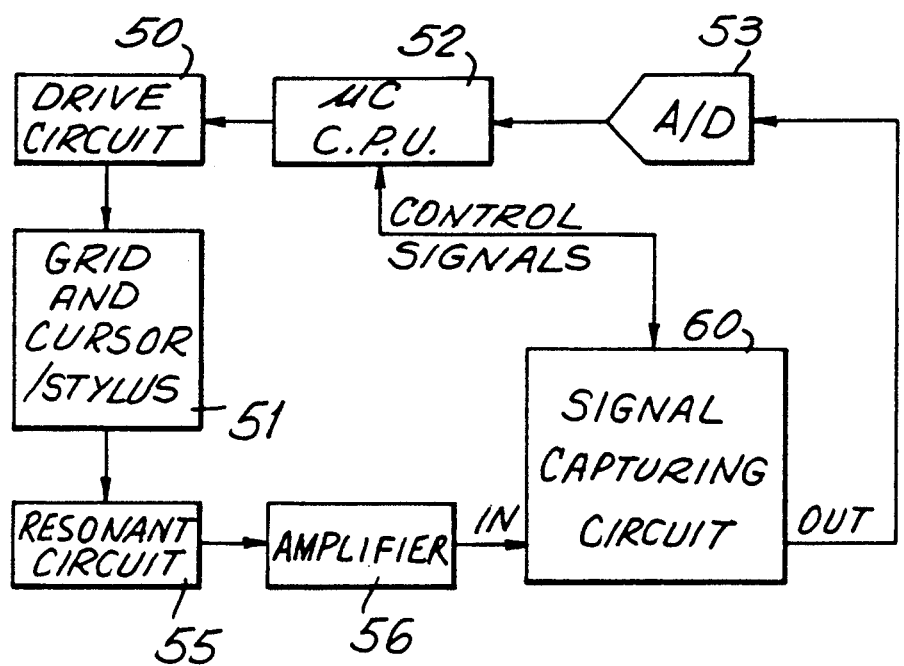
FIG. 2 is a block diagram of one form of the circuitry of a digitizer tablet according to the invention.

FIG. 2 illustrates a block diagram of one form of circuitry in accordance with the present invention. The drive circuit 50 corresponds to the scanner 40 of FIG. 1. The block 51 labelled grid and cursor/stylus corresponds to the tablet with grid conductors 10-32 and the pointing device coil 35. The block 52 corresponds to the microcontroller 45 and memory 44 in FIG. 1. The A/D converter 53 in FIG. 2 corresponds to its counterpart 42 in FIG. 1.

In the present invention, the drive circuit 50 generates fast rise time, low duty-cycle pulses, and a resonant circuit 55 is connected to the component 51 ( grid conductor or pointing device) in which signals are induced. The resonant circuit is tuned to the scan rate or pulse repetition rate and preferably to a much higher frequency. This is readily obtained by adding capacitance and or additional inductance to provide the required resonant frequency. The resonant circuit 55 is either naturally damped or resistance added to dampen it so that significant oscillations occur when excited by the induced signal for only a short time, preferably no more than two to three complete cycles. This is to ensure that the resonant circuit has stopped oscillating well before the next induced signal can excite it. The result is a damped AC ringing signal. This is amplified in an amplifier 56 whose output is then applied to a signal capturing circuit 60 which is under the control of the $\mu$C 52. The resultant analog voltage is converted by the A/D converter 53 into a digital value and stored and/or processed by the $\mu$C 52.

A feature of the invention is the provision of special measures to increase the S/N ratio and improve resolution of the measurement. There are several ways to do this, and two examples are described below, which will be better understood in connection with the waveforms of FIG. 5.

Figure 5A:
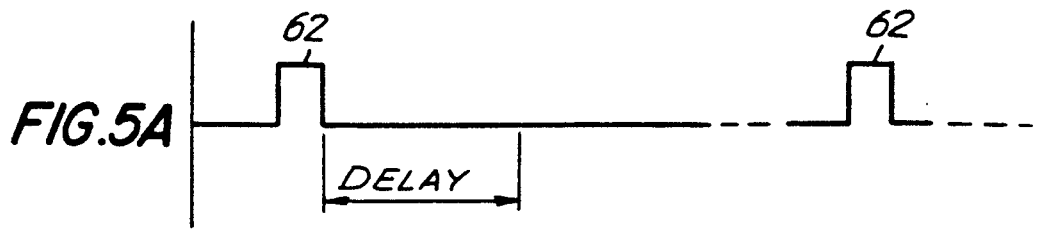
FIG. 5A-5E show various waveforms illustrating operation of the invention.
Figure 5B:
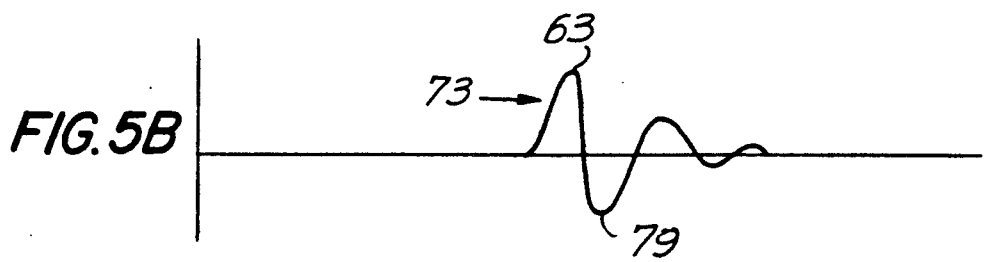

FIG. 5A shows a typical driving pulse sequence, wherein each driving pulse 62 is only on for a short time, typically with a 10 percent or lower duty cycle. Fast rise time pulses are preferred, with a rise time of 0.5 $\mu$s or less. There is a time lag or delay between when the pulse 62 ends, and the resonant circuit is excited. One can optimize the S/N ratio by detecting substantially only the peak 63 of the amplified damped AC signal present at the output of amplifier 56, illustrated in FIG. 5B. One does not have to know when this occurs, by using a known peak detector 65 in the circuit illustrated in FIG. 3, under control of the μC 52. During each cycle, the peak detector 65 is reset when the driving pulse 62 is generated. When the peak voltage is detected, a Peak Detected signal is returned to the μC. Meanwhile, the peak value is transmitted to a known multiplexer 66 which is capable of temporarily storing the resultant analog voltage. A select pulse 67 from the μC 52 determines which signal inputted to the multiplexer 66 is outputted to the A/D connector 53. As will be seen, several output analog voltages can be derived and processed in order to reduce noise or improve resolution. In the additional optional circuitry provided in the dashed line block 68, the same damped AC signal is applied to an inverting amplifier 70 and then to a second positive peak detector 71 whose output signal is also inputted to the multiplexer 66 and which also generates a Peak Detection signal when it recognizes the peak. Due to the polarity inversion, this optional circuit 68 therefore makes a second independent measurement on the same peak 63 (inverted) in FIG. 5B. The select signal 67 will first pass the first peak value to the μC and then pass the second measured peak value to the μC. The μC can be programmed to average the two values for improved resolution.

Figure 5C:
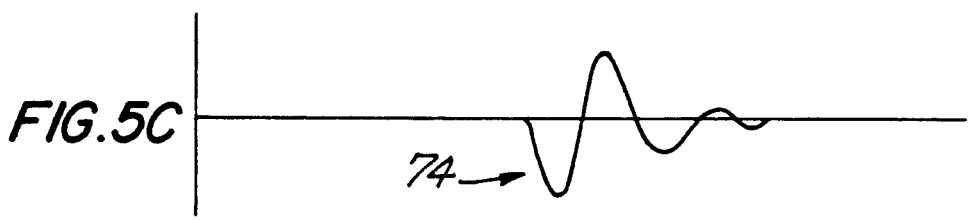
Figure 5D:
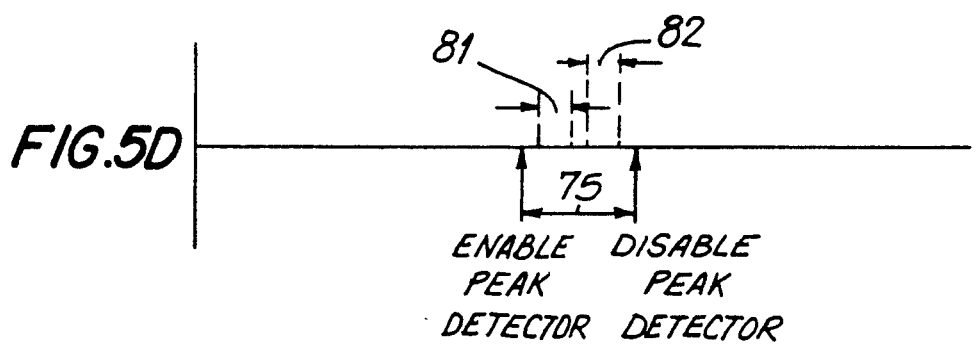
Figure 5E:
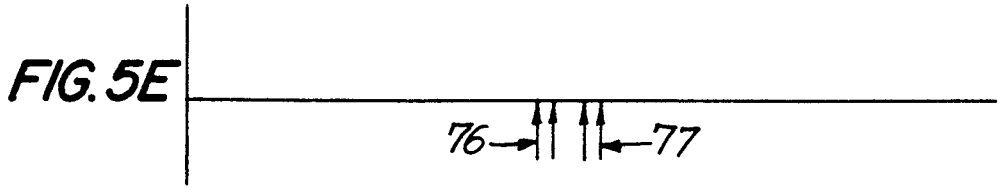

As mentioned above, and as described in some detail in the related application, U.S. Pat. Serial No. 503,537, whose complete contents are incorporated herein by reference, a comparison of the peak signal values for each of the scanned conductors will indicate one of two possible coarse positions of the pointing device, that is, identify the grid conductor closest to the pointing device. However, it cannot tell whether the pointing device is to the right or to the left of the conductor. The latter is determined by the phase of the induced signal. If one assumes that the signal 73 in FIG. 5B results when the pointing device is on the right side of the conductor, then when it is on the left side, a similar signal 74 but opposite in phase is obtained as illustrated in FIG. 5C. The signal phase will have to be determined separately to distinguish between the two possibilities, using the techniques described in the related application.

It is also possible and within the scope of the invention to measure both the positive and the negative peak of each signal, and then average the two values. This is readily obtained through the use of multiple peak detectors, arranged in parallel, each responsive, respectively, only to the positive or negative signal peaks. A delay can be introduced in the processing to ensure that both values do not arrive at the multiplexer at the same time.

Normally, conventional peak detector circuits are time insensitive, which means they operate continuously. Noise pulses can disturb their operation. Noise can be reduced by activating the peak detectors only when the peak voltage is expected. The μC can be programmed to do this because one would know approximately how many μsec. after the start of the driving pulse 62 that the damped AC signal will appear at the input to the peak detector. Thus, the μC is preferably programmed to turn on the peak detector only during the cycle time indicated in FIG. 5D at 75. Or, if only, say, a positive peak 63 is to be detected, then a negative peak 79, the positive peak detector can be enabled during the cycle time represented by numeral 81, and the negative peak detector during the cycle time 82.

Figure 3:
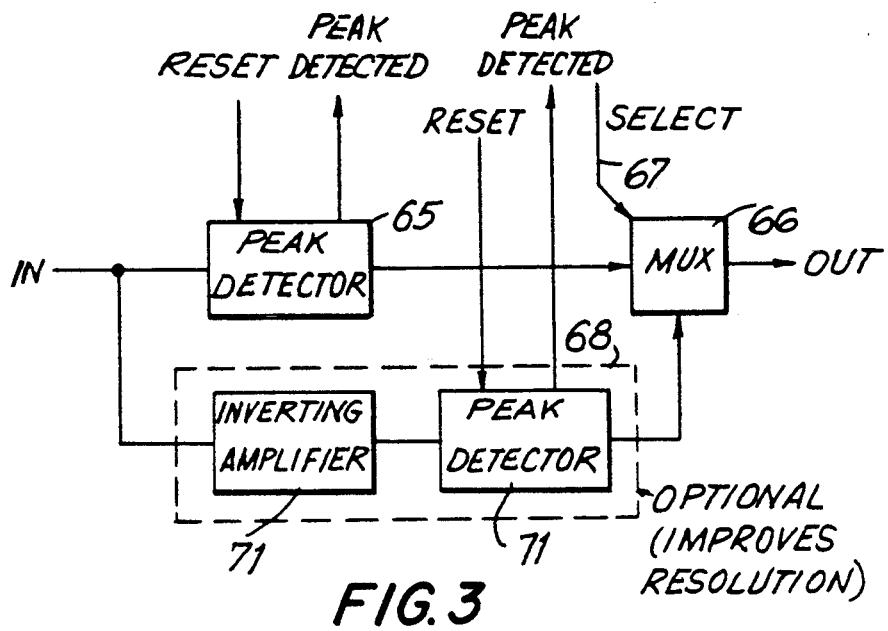
FIG. 3 is a block diagram of the signal capturing block in FIG. 2 for an, asynchronous version of that circuitry.
Figure 4:
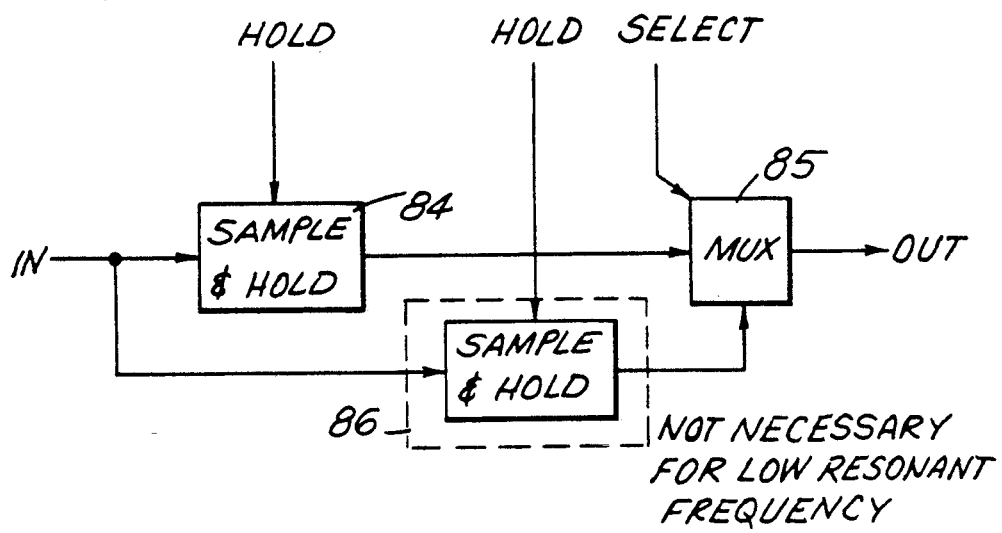
FIG. 4 is a block diagram of the signal capturing block in FIG. 2 for asynchronous version of that circuitry.

The signal capturing circuit of FIG. 3 may be termed asynchronous, in the sense that it is continuously sensitive to and will output peak values of all inputs. The modified signal capturing circuit illustrated in FIG. 4 shows asynchronous system which is timed by the μC 52 to sample the damped AC signal only during the short time when the positive and/or the negative peak is expected, indicated by the times designated 76 and 77 in FIG. 5E. Thus, no peak detector is required yet only the peak values can be captured with the right timing. Again, the reduced sampling time minimizes noise. In the FIG. 4 circuit, the input signal to the signal capturing circuit is applied to a conventional sample and hold (S/H) circuit 84. A HOLD pulse from the μC times the S/H circuit to store (hold) the signal value sampled during the HOLD pulse. The output as before is multiplexed via block 85 under control of a SELECT signal from the μC. For relatively high-frequency resonant frequencies, for example in the range of 200-300 KHz, a second S/H circuit 86 is provided to sample the negative peak, also outputted via the multiplexer 85. Signal averaging of the two signals will improve resolution. For low-frequency resonant frequencies, for example in the range of 10 to 50 KHz, the second S/H circuitry may be omitted. Reference is made to FIGS. 5-9 of related application, U.S. Pat. Serial No. 503,537, and the associated specification description for more details on this dual sample and hold circuit, and typical resultant signals.

As mentioned, fast rise time pulses are preferred. For a duty cycle of 10 percent or less, it is preferred that the rise time is no more than about 20-25 percent of the pulse width. For example, for a pulse width of about 2μs, a rise time of about 0.5μs or less is preferred.

The scan rate used is often governed by the desired report rate, and usually is equal to or greater than the report rate. A common report rate is 100-120 reports per second. The resonant frequency should be higher than the scan rate, and is often determined also by environmental factors, specifically, so as to be adequately separated from interfering frequencies due to nearby electronic equipment. While one would strive, if possible, for a low resonant frequency, I have found that, in general, a resonant frequency four or more times higher than the scan rate is preferred. As an example, which is not to be considered limiting, for a tablet having a report rate of 115/sec., and a scan rate of 10 KHz, a preferred resonant frequency is in the range of 200-250 KHz.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A digitizer tablet comprising:
   (a) an electrode array comprising conductors extending along one coordinate axis,
   (b) means for producing and applying current pulses to selected ones of the conductors to generate fields,
   (c) a pointing device comprising means for interacting with the fields to generate an induced signal, (d) means connected to the pointing device means for generating from the induced signal an AC signal having positive and negative peaks, (e) means for measuring and storing a value representative of the AC signal peaks generated when each of the selected conductors is pulsed, (f) means for processing the values stored by the means of element (e) for determining the position of the pointing device relative to the selected conductors.

2. A digitizer tablet as claimed in claim 1, wherein the means of element (b) comprises means for producing fast rise time pulses with a predetermined pulse repetition frequency and having a low duty cycle.

3. A digitizer tablet as claimed in claim 2, wherein the low duty cycle is 10 percent or less.

4. A digitizer tablet as claimed in claim 3, wherein the low duty cycle is about 2 percent.

5. A digitizer tablet as claimed in claim 3, wherein the pulse rise time is no greater than about 25 percent of the pulse width.

6. A digitizer tablet as claimed in claim 2, wherein the means for generating an AC signal comprises means for generating a damped AC ringing signal.

7. A digitizer tablet as claimed in claim 6, wherein the means for generating a damped AC ringing signal comprises a resonant circuit tuned to a frequency higher than the pulse repetition frequency.

8. A digitizer tablet comprising:
   (a) an electrode array comprising conductors extending along one coordinate axis,
   (b) means for producing and applying low duty cycle current pulses to selected ones of the conductors to generate fields,
   (c) a pointing device comprising means for interacting with the fields to generate an induced signal,
   (d) means connected to the pointing device means for generating from the induced signal a damped AC signal having positive and negative peaks,
   (e) means for measuring and storing a value representative of the AC signal peaks generated when each of the selected conductors is pulsed,
   (f) means for processing the values stored by the means of element (e) for determining the position of the pointing device relative to the selected conductors.

9. A digitizer tablet as claimed in claim 8, wherein the low duty cycle is about 10 percent or less, and the pulse rise time is about 25 percent or less of the pulse width.

10. A digitizer tablet as claimed in claim 9, wherein the means for measuring of element (e) comprises means for discretely sampling the AC signal at a predetermined point in its cycle.

11. A digitizer tablet as claimed in claim 10, wherein the predetermined point in its cycle comprises a positive or negative peak.

12. A digitizer tablet as claimed in claim 9, wherein the means for measuring of element (e) comprises means for discretely sampling the AC signal at both a positive and a negative peak.

13. A digitizer tablet as claimed in claim 12, further comprising means for averaging the samples taken at both the positive and negative peaks.

14. A digitizer tablet as claimed in claim 13, further comprising means for digitizing the samples.

15. A digitizer tablet as claimed in claim 7, further comprising a peak detector connected to the resonant circuit.

16. A digitizer as claimed in claim 7, further comprising a sample and hold circuit connected to the resonant circuit.

17. A digitizer tablet comprising:
   (a) an electrode array comprising conductors extending along one coordinate axis,
   (b) a pointing device,
   (c) means for producing and applying low duty cycle current pulses to the pointing device while scanning selected ones of the conductors to derive induced signals,
   (d) means connected to the conductors for generating from the induced signals damped AC signals having positive and negative peaks,
   (e) means for measuring and storing a value representative of the AC signal peaks generated when each of the selected conductors is scanned,
   (f) means for processing the value stored by the means of element (e) for determining the position of the pointing device relative to the selected conductors.

18. A digitizer tablet as claimed in claim 17, wherein the means of element (b) comprises means for producing fast rise time pulses with a predetermined pulse repetition frequency and having a duty cycle which is 10 percent or less.

19. A digitizer tablet as claimed in claim 17, wherein a resonant circuit tuned to a frequency about 4 or more times higher than the current pulse repetition frequency is connected to each of the conductors in turn.

* * * * *